United States Patent
Wang

(10) Patent No.: US 9,524,684 B2
(45) Date of Patent: Dec. 20, 2016

(54) DISPLAY PANEL AND DRIVING METHOD FOR THE SAME

(71) Applicant: SHENZHEN CHINA STAR OPTOELECTRONICS TECHNOLOGY CO., LTD., Guangdong (CN)

(72) Inventor: Zui Wang, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 357 days.

(21) Appl. No.: 14/378,902

(22) PCT Filed: May 16, 2014

(86) PCT No.: PCT/CN2014/077671
§ 371 (c)(1),
(2) Date: Aug. 14, 2014

(87) PCT Pub. No.: WO2015/154330
PCT Pub. Date: Oct. 15, 2015

(65) Prior Publication Data
US 2016/0247467 A1    Aug. 25, 2016

(30) Foreign Application Priority Data
Apr. 10, 2014   (CN) .......................... 2014 1 0142517

(51) Int. Cl.
G09G 3/36    (2006.01)
H04N 13/00   (2006.01)
(Continued)

(52) U.S. Cl.
CPC ............ *G09G 3/3614* (2013.01); *G09G 3/003* (2013.01); *G09G 3/3648* (2013.01); *H04N 13/00* (2013.01);
(Continued)

(58) Field of Classification Search
CPC .... G09G 3/3614; G09G 3/003; G09G 3/3648; G09G 2300/0876; G09G 2320/0233; G09G 2320/0242; G09G 2320/0257; H04N 13/00
See application file for complete search history.

(56) References Cited

U.S. PATENT DOCUMENTS

2012/0206658 A1* 8/2012 Yoshida ............ G02F 1/136213
                                                     348/731
2013/0335393 A1* 12/2013 Wang ................. H04N 13/0429
                                                     345/212

(Continued)

FOREIGN PATENT DOCUMENTS

CN        102707527 A     10/2012

Primary Examiner — Andrew Sasinowski
Assistant Examiner — Kelly B Hegarty
(74) Attorney, Agent, or Firm — Sughrue Mion, PLLC

(57) ABSTRACT

A display panel and a driving method for the same are provided. The display panel comprises at least one data line and pixel row units. The pixel row unit comprises a common line, a first pixel, a second pixel, a charge control line, a sharing control line, a fourth switch, a second sharing capacitor, and a switch control line. The charge control line is configured to turn on/off the first and second switches. The sharing control line is configured to turn on/off a third switch. The switch control line is configured to turn on/off a fourth switch.

19 Claims, 6 Drawing Sheets

(51) Int. Cl.
*G09G 3/00* (2006.01)
*H04N 13/04* (2006.01)

(52) U.S. Cl.
CPC ...... *H04N 13/0438* (2013.01); *H04N 13/0497* (2013.01); *G09G 2300/0876* (2013.01); *G09G 2320/0233* (2013.01); *G09G 2320/0242* (2013.01); *G09G 2320/0257* (2013.01); *H04N 13/0452* (2013.01)

(56) References Cited

U.S. PATENT DOCUMENTS

2015/0170595 A1* 6/2015 Chen ................... G09G 3/3696
  345/212
2016/0247467 A1* 8/2016 Wang ................... H04N 13/00

* cited by examiner

DISPLAY PANEL AND DRIVING METHOD FOR THE SAME

FIELD OF THE INVENTION

The present invention relates to a display technology, and more particularly to a display panel and a driving method for the same.

BACKGROUND OF THE INVENTION

For a three-dimension (3D) display technology using shutter glasses, a driving method with the polarity inversion as shown in FIG. 1 is used to form differences between right and left eye images to achieve a 3D effect. However, this driving method results in polarity asymmetry, and further results in an image sticking phenomenon. As shown in FIG. 1, in the driving method with polarity reversion, the polarities of a data signal 101 in two adjacent frames are opposite each other with respect to a common signal 102.

To solve the above-mentioned image sticking problems of 3D images in the conventional technology, a 2-frame-inversion driving is used, as shown in FIG. 2.

In this conventional technology, for solving a color shift problem at a broad viewing angle, in general, a charge sharing technology is used for pixels of a display panel. As shown in FIG. 3, in this case, a pixel unit comprises a main pixel 301 and a sub-pixel 302. The main pixel 301 and the sub-pixel 302 are connected to a data line 303, and are connected to a scan line 304 through a first thin film transistor 3011 and a second thin film transistor 3012, respectively. The main pixel 301 and the sub-pixel 302 are further connected to a common line 305. The main pixel 301 includes a first liquid crystal (LC) capacitor 3012 and a first storage capacitor 3013. The sub-pixel 302 includes a second liquid crystal (LC) capacitor 3022, a second storage capacitor 3023, a sharing capacitor 3025, and a third TFT 3024. The sharing capacitor 3025, a third TFT 3024, the second LC capacitor 3022, and the second storage capacitor 3023 are connected to a control line 306. When the signal polarities of two frames of images of the display are opposite each other, the sharing capacitor 3025 receives electric charges from the second LC capacitor 3022, thereby lowering a voltage of the sub-pixel 302 (reducing the electric charges in the sub-pixel 302).

In practice, there are some problems in the conventional technology, as described below.

In the above-mentioned charge sharing technology, a voltage level of sub-pixels is affected by the charging of a former frame. If the 2-frame-inversion driving is used for the display panel, the signal polarities of the right and left eye images will be the same or opposite each other. This results in a brightness difference between the right and left eye images, further resulting in a crosstalk problem.

As a result, it is necessary to provide a new technology to solve the problems existing in the conventional technologies.

SUMMARY OF THE INVENTION

A primary object of the present invention is to provide a display panel, which is in the 3D display mode and using a 2-frame-inversion driving, for achieving an identical brightness of the right and left eye images.

To solve the above-mentioned problems, the present invention provides a display panel, wherein the display panel comprises: at least one data line, and at least two pixel row units. Each of the pixel row units comprises: a common line; at least two pixel units, wherein each of the pixel units comprises: a first pixel including a first switch and a first liquid crystal (LC) capacitor; and a second pixel including a second switch, a second LC capacitor, a third switch, and a first sharing capacitor, wherein the third switch is connected to the second LC capacitor and the first sharing capacitor, and the first pixel and the second pixel are connected to the data line and the common line; a charge control line configured to control the turning on/off of the first switch and the second switch with the use of a charge control signal; and a sharing control line configured to control the turning on/off of the third switch with the use of a sharing control signal. Each of the pixel units further comprises: a fourth switch; a second sharing capacitor, wherein the fourth switch is connected to the second LC capacitor and the second sharing capacitor; and a switch control line configured to control the turning on/off of the fourth switch with the use of a switch control signal. The charge control line is connected to a first gate electrode of the first switch and a second gate electrode of the second switch, and the data line is connected to a first source electrode of the first switch and a second source electrode of the second switch, and the first LC capacitor is connected to a first drain electrode of the first switch, and the second LC capacitor is connected to a second drain electrode of the second switch, and a third gate electrode of the third switch is connected to the sharing control line, and a fourth gate electrode of the fourth switch is connected to the switch control line, and a third source electrode and a third drain electrode of the third switch are connected to the second drain electrode or the fourth switch, respectively. In a 3D display mode of the display panel and using a 2-frame-inversion driving, when a signal polarity of a current frame is opposite a signal polarity of a former frame, the switch control line transmits the switch control signal to turn off the fourth switch, and the sharing control line transmits the sharing control signal to turn on the third switch, such that electric charges from the second LC capacitor are received by the first sharing capacitor. In the 3D display mode of the display panel and using the 2-frame-inversion driving, when the signal polarity of the current frame is identical to the signal polarity of the former frame, the switch control line transmits the switch control signal to turn on the fourth switch, and the sharing control line transmits the sharing control signal to turn on the third switch, such that electric charges from the second LC capacitor is received by the first sharing capacitor and the second sharing capacitor.

In the above-mentioned display panel, when the display panel is in a 2D display mode, the fourth switch is configured close a fourth current channel between the second sharing capacitor and the first sharing capacitor/the third switch.

In the above-mentioned display panel, the display panel further comprises a main control line, and the pixel row unit further comprises a main control switch, and a first terminal of the main control switch is connected to the sharing control line, and a second terminal of the main control switch is connected to the switch control line, and a third terminal of the main control switch is connected to the main control line, and the main control line is configured to control the turning on/off of the main control switch by using a main control signal.

In the 3D display mode of the display panel and using the 2-frame-inversion driving, when the signal polarity of the current frame is opposite the signal polarity of the former frame, the main control signal is used to turn off the main control switch.

In the 3D display mode of the display panel and using the 2-frame-inversion driving, when the signal polarity of the current frame is identical to the signal polarity of the former frame, the main control signal is used to turn on the main control switch, and the first sharing control signal and the second sharing control signal are the same signals.

In the above-mentioned display panel, when the display panel is in a 2D display mode, the main control signal is used to turn off the main control switch.

In the above-mentioned display panel, the sharing control line is connected to the charge control line of another adjacent pixel row unit.

The present invention further provides a display panel, wherein the display panel comprises: at least one data line, and at least two pixel row units. Each of the pixel row units comprises: a common line; at least two pixel units, wherein each of the pixel units comprises: a first pixel including a first switch and a first liquid crystal (LC) capacitor; and a second pixel including a second switch, a second LC capacitor, a third switch and a first sharing capacitor, wherein the third switch is connected to the second LC capacitor and the first sharing capacitor, and the first pixel and the second pixel are connected to the data line and the common line; a charge control line configured to control the turning on/off of the first switch and the second switch with the use of a charge control signal; and a sharing control line configured to control the turning on/off of the third switch with the use of a sharing control signal. Each of the pixel units further comprises: a fourth switch; a second sharing capacitor, wherein the fourth switch is connected to the second LC capacitor and the second sharing capacitor; and a switch control line configured to control the turning on/off of the fourth switch with the use of a switch control signal. The charge control line is connected to a first gate electrode of the first switch and a second gate electrode of the second switch, and the data line is connected to a first source electrode of the first switch and a second source electrode of the second switch, and the first LC capacitor is connected to a first drain electrode of the first switch, and the second LC capacitor is connected to a second drain electrode of the second switch, and a third gate electrode of the third switch is connected to the sharing control line, and a fourth gate electrode of the fourth switch is connected to the switch control line, and a third source electrode and a third drain electrode of the third switch are connected to the second drain electrode or the fourth switch, respectively.

In a 3D display mode of the display panel and using a 2-frame-inversion driving, when a signal polarity of a current frame is opposite a signal polarity of a former frame, the switch control line transmits the switch control signal to turn off the fourth switch, and the sharing control line transmits the sharing control signal to turn on the third switch, such that electric charges from the second LC capacitor are received by the first sharing capacitor.

In a 3D display mode of the display panel and using a 2-frame-inversion driving, when a signal polarity of a current frame is identical to a signal polarity of a former frame, the switch control line transmits the switch control signal to turn on the fourth switch, and the sharing control line transmits the sharing control signal to turn on the third switch, such that electric charges from the second LC capacitor are received by the first sharing capacitor and the second sharing capacitor.

In the above-mentioned display panel, when the display panel is in a 2D display mode, the fourth switch is configured close a fourth current channel between the second sharing capacitor and the first sharing capacitor/the third switch.

In the above-mentioned display panel, the display panel further comprises a main control line, and the pixel row unit further comprises a main control switch, and a first terminal of the main control switch is connected to the sharing control line, and a second terminal of the main control switch is connected to the switch control line, and a third terminal of the main control switch is connected to the main control line, and the main control line is configured to control the turning on/off of the main control switch by using a main control signal.

In the 3D display mode of the display panel and using the 2-frame-inversion driving, when the signal polarity of the current frame is opposite the signal polarity of the former frame, the main control signal is used to turn off the main control switch.

In the 3D display mode of the display panel and using the 2-frame-inversion driving, when the signal polarity of the current frame is identical to the signal polarity of the former frame, the main control signal is used to turn on the main control switch, and the first sharing control signal and the second sharing control signal are the same signals.

In the above-mentioned display panel, when the display panel is in a 2D display mode, the main control signal is used to turn off the main control switch.

In the above-mentioned display panel, the sharing control line is connected to the charge control line of another adjacent pixel row unit.

The present invention further provides a driving method for the display panel, wherein the driving method comprises: in a 3D display mode of the display panel and using a 2-frame-inversion driving, when a signal polarity of a current frame is opposite a signal polarity of a former frame, using the switch control line to transmit the switch control signal for turning off the fourth switch, and using the sharing control line to transmit the sharing control signal for turning on the third switch, such that electric charges from the second LC capacitor are received by the first sharing capacitor; and in the 3D display mode of the display panel and using the 2-frame-inversion driving, when the signal polarity of the current frame is identical to the signal polarity of the former frame, using the switch control line to transmit the switch control signal for turning on the fourth switch, and using the sharing control line to transmit the sharing control signal for turning on the third switch, such that electric charges from the second LC capacitor are received by the first sharing capacitor and the second sharing capacitor.

In the above-mentioned driving method of the display panel, the display panel further comprises a main control line, and the pixel row unit further comprises a main control switch, and the driving method further comprises: in the 3D display mode of the display panel and using the 2-frame-inversion driving, when the signal polarity of the current frame is opposite the signal polarity of the former frame, using the main control signal to turn off the main control switch; and when the signal polarity of the current frame is identical to the signal polarity of the former frame, using a main control signal from the main control line to turn on the main control switch.

In the above-mentioned driving method of the display panel, the driving method further comprises: when the display panel is in a 2D display mode, using a main control signal from the main control line to turn off the main control switch.

In comparison with the conventional technology, the display panel and the driving method for the same in the present invention can achieve an identical brightness of the right and left eye images.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The following embodiments are referring to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

Figure 1:
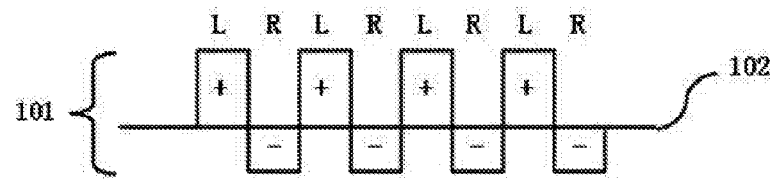
FIG. 1 is a schematic diagram showing a polarity inversion driving for a conventional display panel.
Figure 2:
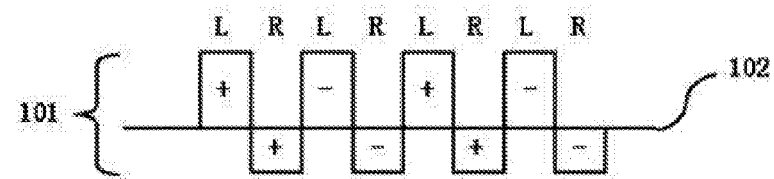
FIG. 2 is a schematic diagram showing a 2-frame-inversion driving in a 3D mode for the conventional display panel.
Figure 3:
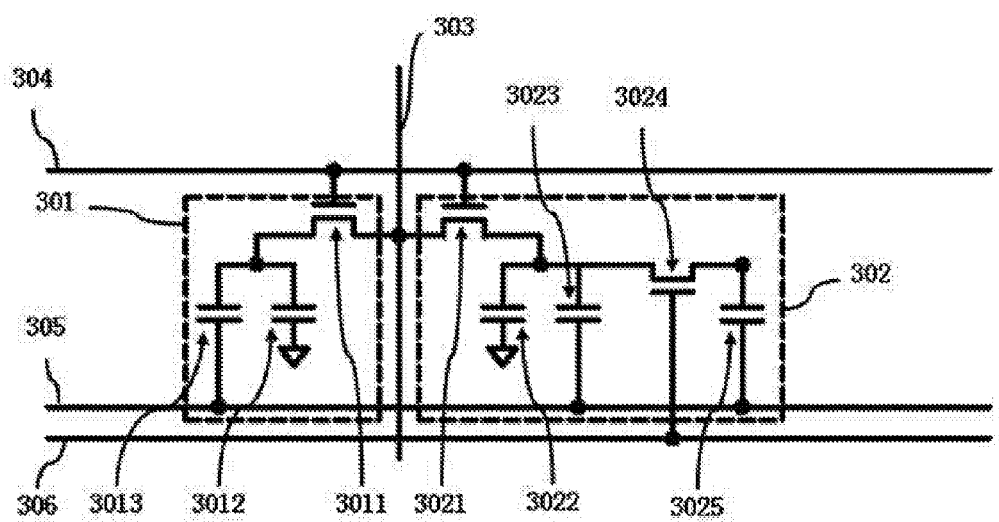
FIG. 3 is a schematic diagram showing a charge sharing circuit in the conventional display panel.
Figure 4:
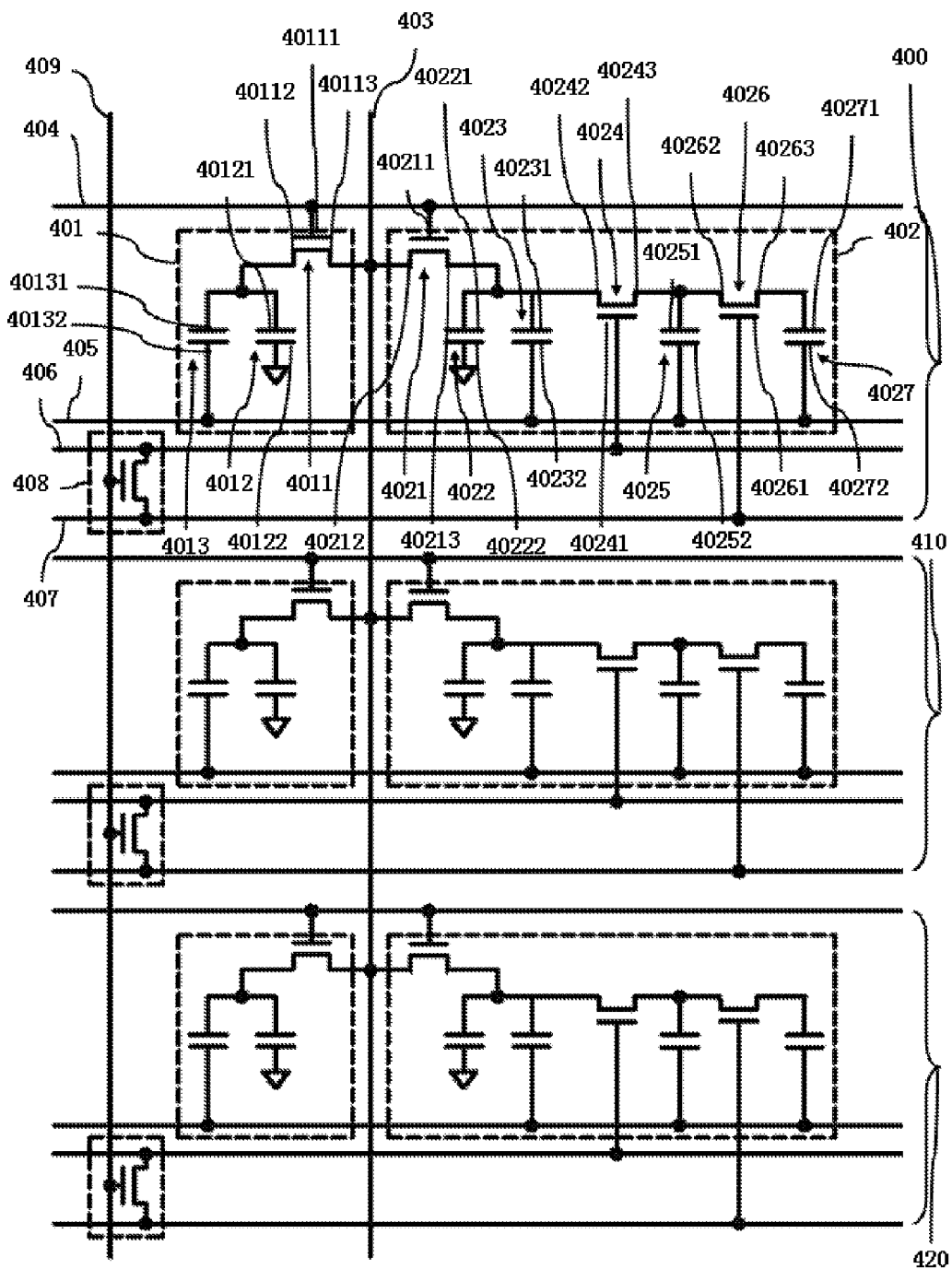
FIG. 4 is a schematic diagram showing a display panel according to a first embodiment of the present invention.

FIG. 4 is a schematic diagram showing a display panel according to a first embodiment of the present invention. The display panel of the present invention comprises a thin film transistor (TFT) array substrate, a color filter (CF) substrate, a liquid crystal layer disposed between the TFT and CF substrates, a scan driving circuit, and a data driving circuit. In this case, the TFT array substrate comprises at least two pixel units, and the at least two pixel units are arranged as an array of M*N rows, wherein M and N are positive integers. The pixel units in the display panel of the present invention are illustrated in FIG. 4 as a circuit diagram.

The display panel of the present embodiment comprises at least one data line 403 and at least two pixel row units 400, 410, 420, and the at least two pixel row units 400, 410, 420 are arranged in a matrix manner, wherein the each of the pixel row units 400, 410, 420 comprises a common line 405, at least two pixel units, a charge control line 404, and a sharing control line 406.

The pixel unit comprises a first pixel 401 and a second pixel 402. For example, the first pixel 401 may be a main pixel, and the second pixel 402 may be a sub-pixel. Certainly, in another embodiment, the first pixel 401 may be a sub-pixel, and the second pixel 402 may be a main pixel. In this embodiment, the first pixel 401 may be the main pixel, and the second pixel 402 may be the sub-pixel.

The first pixel 401 includes a first switch 4011 and a first liquid crystal (LC) capacitor 4012. The first switch 4011 is connected to the charge control line 404, the data line 403 and the first LC capacitor 4012.

The second pixel 402 comprises a second switch 4021, a second LC capacitor 4022, a first storage capacitor 4023, a third switch 4024, and a first sharing capacitor 4025. The third switch 4024 is connected to the second LC capacitor 4022 and the first sharing capacitor 4025. The second switch 4021 is connected to the charge control line 404, the data line 403, and the second LC capacitor 4022. In this case, the first pixel 401 and the second pixel 402 are connected to the data line 403 and the common line 405. Specifically, the first pixel 401 further comprises a first storage capacitor 4013, and the first storage capacitor 4013 and the first LC capacitor 4012 are connected to the common line 405. The second pixel 402 further comprises a second storage capacitor 4023, and the second storage capacitor 4023 and the second LC capacitor 4022 are connected to the common line 405. In this embodiment, the first switch 4011, the second switch 4021, and the third switch 4031 may be transistors, such as TFTs.

The charge control line 404 is configured to control the turning on/off of the first switch 4011 and the second switch 4021 with the use of a charge control signal. Specifically, the charge control line 404 is configured to transmit the charge control signal to the first switch 4011 and the second switch 4021. The charge control signal is configured to turn on/off the first switch 4011 and the second switch 4021. The turning on/off of the first switch 4011 corresponds to an opening or a closing of a first current channel between the data line 403 and the first LC capacitor 4012. Similarly, the turning on/off of the second switch 4021 corresponds to an opening or a closing of a second current channel between the data line 403 and the second LC capacitor 4022.

The sharing control line 406 is configured to control the turning on/off of the third switch 4024 with the use of a sharing control signal. A gate electrode of the third switch 4024 is connected to the sharing control line 406 for receiving the sharing control signal transmitted from the sharing control line 406. The turning on/off of the third switch 4024 corresponds to an opening or a closing of a third current channel between the first sharing capacitor 4025 and the second LC capacitor 4022.

In this manner, when polarities of image signals of two adjacent frames are opposite each other, the first sharing capacitor 4025 is configured to reduce a voltage/electric charge down to a predetermined value. However, when the polarities of the image signals of the two adjacent frames are identical, the first sharing capacitor 4025 is incapable of reducing the voltage/electric charge down to the predetermined value. This results in a higher brightness of image frames when the polarities of the image signals of the two adjacent frames are identical.

Herein, the pixel unit further comprises a fourth switch 4026, a second sharing capacitor 4027, and a switch control line 407. The fourth switch 4026, the second LC capacitor 4022, and the second sharing capacitor 4027 are connected to the switch control line 407, and the second sharing capacitor 4027 is connected to the common line 405. In this embodiment, the fourth switch 4026 may be a transistor, such as a TFT. Herein, the fourth switch 4026 and the second sharing capacitor 4027 are disposed in the second pixel 402. The switch control line 407 is connected to a gate electrode of the fourth switch 4026, and the switch control line 407 is configured to control the turning on/off of the fourth switch 4026 with the use of a switch control signal. The turning on/off of the fourth switch 4026 corresponds to an opening or a closing of a fourth current channel between the second sharing capacitor 4027 and the first sharing capacitor 4025. In this embodiment, the fourth switch 4026 is turned on when a signal polarity of a current frame is identical to a signal polarity of a former frame. This results in an identical brightness of the right and left eye images of the display panel. In addition, the fourth switch 4026 is turned off when the signal polarity of the current frame is opposite the signal polarity of the former frame, and when display panel is in a 2D display mode.

Specifically, in a 3D display mode of the display panel of this embodiment and using a 2-frame-inversion driving, when the signal polarity of the current frame is opposite the signal polarity of the former frame, the switch control line 407 is configured to turn off the fourth switch 4026 with the use of the switch control signal, and the sharing control line 406 is configured to turn on the third switch 4024 with the use of the sharing control signal, such that the first sharing capacitor 4025 can receive the electric charges from the second LC capacitor 4022. In the 3D display mode of the display panel of this embodiment and using the 2-frame-inversion driving, when the signal polarity of the current frame is identical to the signal polarity of the former frame, the switch control line 407 is configured to turn on the fourth switch 4026 with the use of the switch control signal, and the sharing control line 406 is configured to turn on the third switch 4024 with the use of the sharing control signal, such that the second sharing capacitor 4027 can be connected to the first sharing capacitor 4025, and the second sharing capacitor 4027 and the first sharing capacitor 4025 can be used to receive the electric charges from the second LC capacitor 4022.

Figure 5:
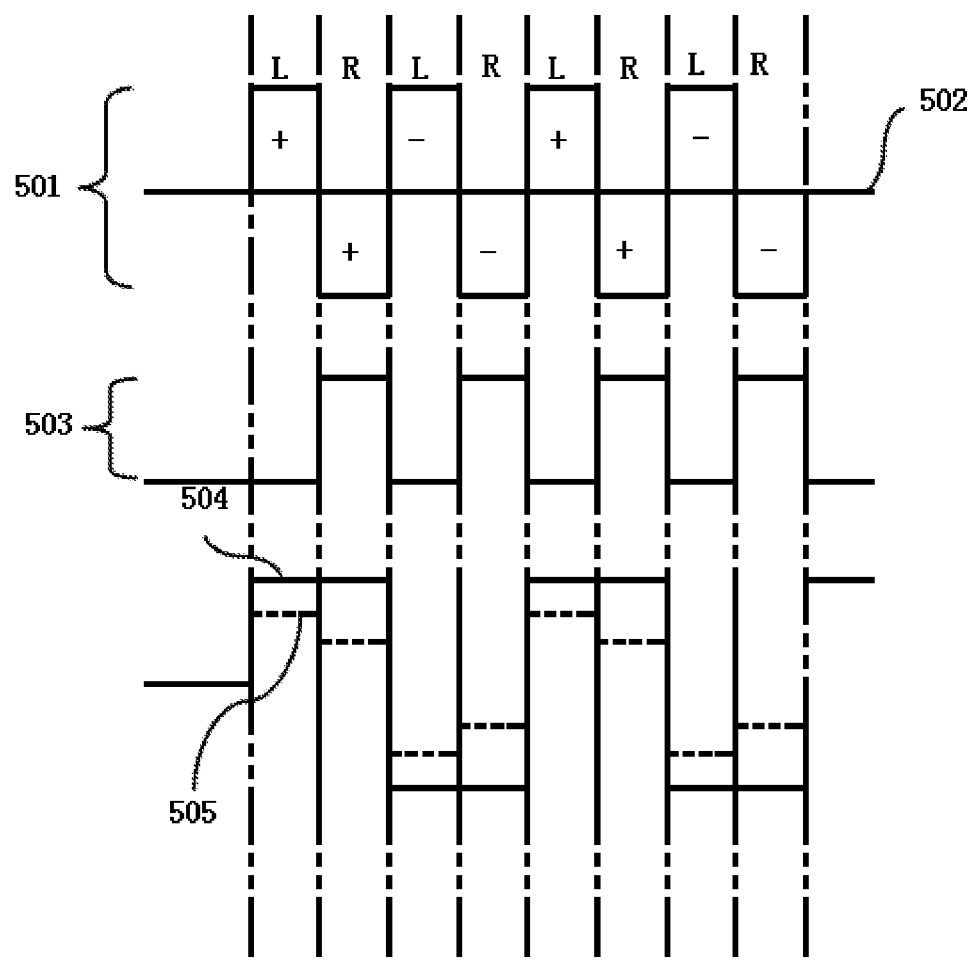
FIG. 5 is a schematic diagram showing the polarity of the pixel unit and the signals of the main control line in FIG. 4.

Referring to FIG. 5, in the 3D display mode of the display panel of this embodiment and using the 2-frame-inversion driving, a signal polarity of a left-eye image signal L is opposite a signal polarity of a former frame, and a signal polarity of a right-eye image signal R is identical to a signal polarity of another former frame. Herein, the image signal 501 (data signal provided by the data line 403) comprises the left-eye image signal and right-eye image signal. A reference number 502 refers to a signal in the common line. Therefore, when a left-eye image is displayed by the display panel, the switch control signal of the switch control line 407 is a low-level signal. At this time, the fourth switch 4026 is turned off, and the charge sharing for the pixel unit is achieved only by the first sharing capacitor 4025. Correspondingly, as shown in FIG. 5, at this time, a first data signal 504 for the first pixel 401 has a first voltage value, and a second data signal 505 for the second pixel 402 has a first voltage value. When the display panel is switched to display a right-eye image, the switch control signal of the switch control line 407 is a high-level signal. At this time, the fourth switch 4026 is turned on, and the charge sharing for the pixel unit can be achieved by the first sharing capacitor 4025 and the second sharing capacitor 4027. That is, the first sharing capacitor 4025 and the second sharing capacitor 4027 can receive the electric charges from the second LC capacitor 4022/second storage capacitor 4023 at the same time. Correspondingly, as shown in FIG. 5, at this time, the first data signal 504 for the first pixel 401 still has the first voltage value (without using the sharing capacitor to receive the electric charges in the first LC capacitor), and the second data signal 505 for the second pixel 402 has a third voltage value, wherein the third voltage value is less than the second voltage value. This is because the electric charges in the second LC capacitor 4022 are received (shared) by the first sharing capacitor 4025 and the second sharing capacitor 4027 at the same time, and in comparison with the electric charges received (shared) only by the first sharing capacitor 4025, the electric charges reserved in the second LC capacitor 4022 are reduced.

In this embodiment, a first gate electrode 40111 of the first switch 4011 is connected to the charge control line 404, and a first source electrode 40133 of the first switch 4011 is connected to the data line 403, and a first drain electrode 40112 of the first switch 4011 is connected to the first LC capacitor 4012 and a first electrode 40131 of the first storage capacitor 4013. A second electrode 40132 of the first storage capacitor 4013 is connected to the common line 405.

A second gate electrode 40211 of the second switch 4021 is connected to the charge control line 404, and a second source electrode 40212 of the second switch 4021 is connected to the data line 403, and a second drain electrode 40213 of the second switch 4021 is connected to the second LC capacitor 4022, a third electrode 40231 of the second storage capacitor 4023, the third switch 4024, the first sharing capacitor 4025, the fourth switch 4026, and the second sharing capacitor 4027. A fourth electrode 40232 of the second storage capacitor 4023 is connected to the common line 405.

A third gate electrode 40241 of the third switch 4024 is connected to the sharing control line 406, and a third source electrode 40242 or a third drain electrode 40242 is connected to the second drain electrode 40213 of the second switch 4021. The third source electrode 40242 or third drain electrode 40242 is connected to a fifth electrode 40251 of the first sharing capacitor 4025 and a fourth source electrode 40262 (or a fourth drain electrode 40262) of the fourth switch 4026. The fourth source electrode 40262 or fourth drain electrode 40262 of the fourth switch 4026 is connected to a seventh electrode of the second sharing capacitor 4027. A fourth gate electrode 40261 of the fourth switch 4026 is connected to the switch control line 407. A sixth electrode 40252 of the first sharing capacitor 4025 is connected to the common line 405, and an eighth electrode 40272 of the second sharing capacitor 4027 is connected to the common line 405.

In this embodiment, since the fourth switch 4026 is turned on only when displaying the right-eye images by the display panel, by adjusting a value of the second sharing capacitor 4027 to reduce the voltage/electric charge of the second pixel 402, the voltage/electric charge when displaying the right-eye images is similar to the voltage/electric charge when displaying the left-eye images, thereby achieving an identical brightness for the right and left eye images.

With the use of this invention, when using the 2-frame-inversion driving in the present embodiment, the brightness between the right and left eye images of the displayed 3D images can be identical. Therefore, the 3D cross-talk and the image sticking phenomenon can be reduced, and the display panel can have a great display effect at a broad viewing angle.

In the display panel of the present embodiment, the display panel can further comprise a main control line 409. The main control line 409 is connected to each of the pixel row units 400. Specifically, the pixel row unit further comprises a main control switch 408, and the main control line 409 is connected to the main control switch 408 of each of the pixel row units 400. In this embodiment, the main control line 409 is perpendicular to a direction of the pixel row unit 400. That is, the main control line 409 is parallel to the data line 403.

As to the charge sharing, the display panel can have various designs for different driving methods and layouts. In this embodiment, a turning-on time of the pixel unit in the m-th row is later than a turning-on time of the first switch 4011/second switch 4021 in the same row (the m-th row) by a charge period. That is, the pixel unit in the m-th row and the first switch 4011/second switch 4021 in the (m+1)-th row are turned on at the same time. Herein, m is a positive integer.

In this embodiment, the sharing control line 406 and the switch control line 407 are connected to independent signal sources, respectively. That is, the sharing control signal of the sharing control line 406 and the switch control signal of the switch control line 407 are generated from different signal sources.

A first terminal (the fifth source electrode or the fifth drain electrode) of the main control switch 408 is connected to the sharing control line 406, and a second terminal (the fifth source electrode or the fifth drain electrode) of the main control switch 408 is connected to the switch control line 407, and a third terminal (the fifth gate electrode) of the main control switch 408 is connected to the main control line 409. In this case, the main control line 409 is configured to control the turning on/off of the main control switch 408 by using a main control signal. In this embodiment, the main control switch 408 may be a transistor, such as a TFT. The turning on/off of the main control switch 408 corresponds to an opening or a closing of a fifth current channel between the sharing control line 406 and the switch control line 407. The main control signal transmitted from the main control line 409 may be a scan signal. That is, the main control signal can scan the pixel row unit 400 in a row-by-row manner, so as to control the turning on/off of the main control switch 408.

FIG. 5 is a schematic diagram showing the polarity of the pixel unit and the signals of the main control line 409 in FIG. 4. In the 3D display mode of the display panel of this embodiment and using the 2-frame-inversion driving, when a signal polarity of a current frame (corresponding to the intervals L in FIG. 5) is opposite a signal polarity of a former frame, the main control signal is configured to turn off the main control switch 408. Specifically, at this time, the main control signal is a low-level signal, and the sharing control line 406 and the switch control line 407 are disconnected. At this time, the charge sharing for the pixel unit is achieved only by the first sharing capacitor 4025. When a signal polarity of a current frame (corresponding to the intervals R in FIG. 5) is opposite a signal polarity of a former frame, the main control signal is configured to turn on the main control switch 408. Specifically, at this time, the main control signal is a high-level signal, and the sharing control line 406 and the switch control line 407 are connected to each other. That is, when the main control switch 408 is turned on, the first sharing control signal and the second sharing control signal are the same signals, and the third switch 4024 and the fourth switch 4026 are turned on at the same time. In that manner, the charge sharing for the pixel unit can be achieved by the first sharing capacitor 4025 and the second sharing capacitor 4027 for achieving a uniform brightness of the right and left eye images.

In the display panel of this embodiment, when the display panel is in the 2D display mode, the main control signal is configured to turn off the main control switch 408. Specifically, at this time, the main control signal is a low-level signal, and the sharing control line 406 and the switch control line 407 are disconnected.

Figure 6:
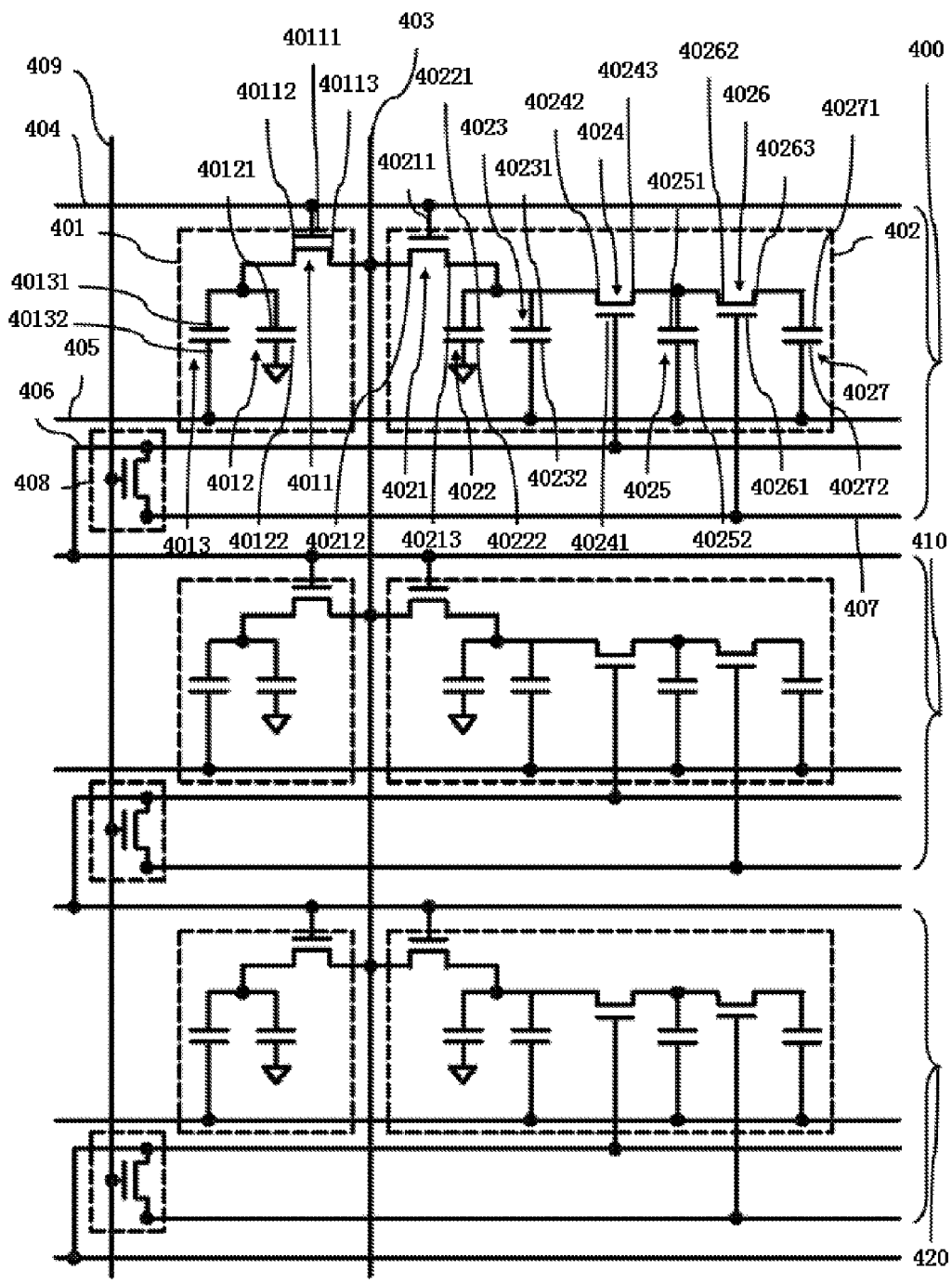
FIG. 6 is a schematic diagram showing a display panel according to a second embodiment of the present invention.

FIG. 6 is a schematic diagram showing a display panel according to a second embodiment of the present invention.

In the display panel of this embodiment, the sharing control line 406 is connected to the charge control line of another adjacent pixel row unit. That is, the sharing control line in the m-th row is connected to the charge control line in the (m+1)-th row. At this time, the sharing control signal of the sharing control line in the m-th row and the charge control signal of the charge control line in the (m+1)-th row are the same signals. Herein, m is a positive integer.

Figure 7:
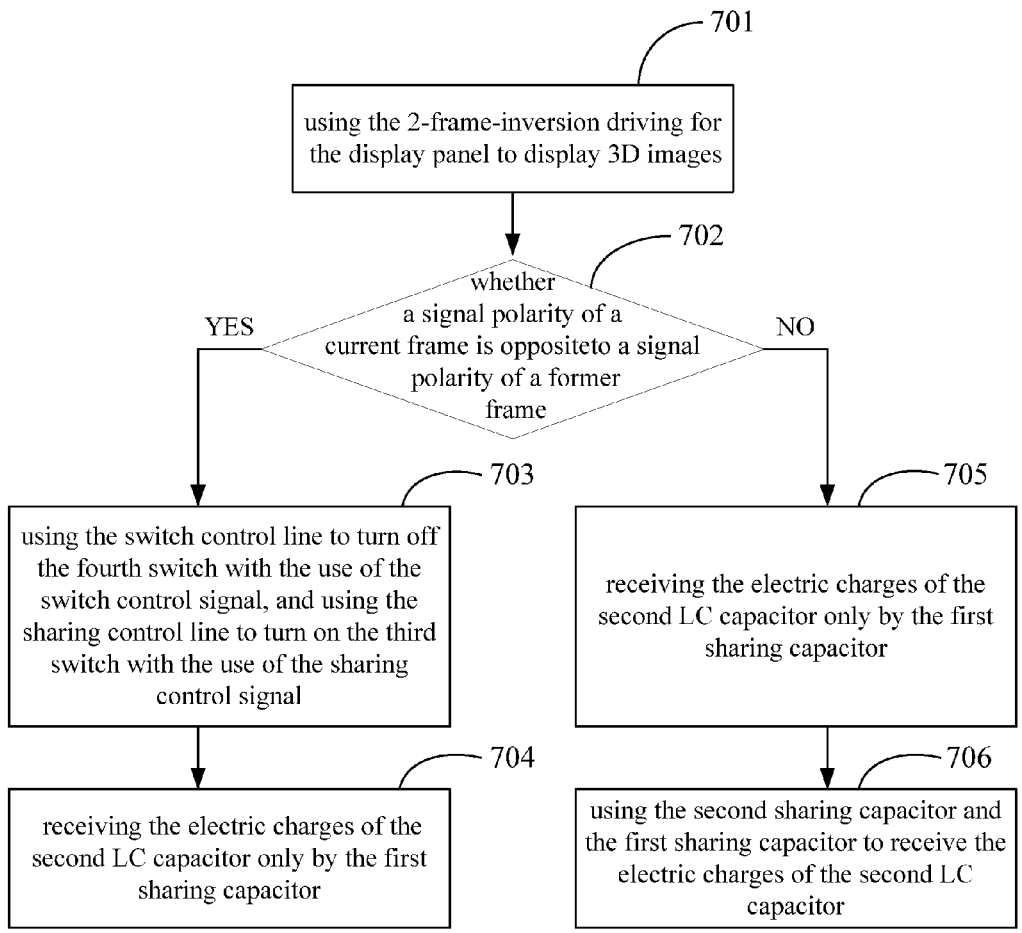
FIG. 7 is a flow diagram showing a driving method for the display panel according to a first embodiment of the present invention.

FIG. 7 is a flow diagram showing a driving method for the display panel according to a first embodiment of the present invention.

The driving method of the present invention is executed for the display panel according to various embodiments shown in FIGS. 4 to 6, and the display panel using the driving method is in the 3D display mode with a 2-frame-inversion driving. The method comprises the steps described as follows.

In a step 701, the 2-frame-inversion driving is used for the display panel to display 3D images. Specifically, the charge control line transmits the charge control signal to the first switch 4011 and the second switch 4021, so as to turn on/off the first switch 4011 and the second switch 4021. The first current channel and the second current channel are opened or closed.

In a step 702, if a signal polarity of a current frame of the display panel is opposite a signal polarity of a former frame thereof, a step 703 is implemented. If the signal polarity of the current frame of the display panel is identical to the signal polarity of the former frame thereof, a step 705 is implemented.

In the step 703, the switch control line 407 is used to turn off the fourth switch 4026 with the use of the switch control signal, and the sharing control line 406 is used to turn on the third switch 4024 with the use of the sharing control signal. Specifically, the switch control line 407 transmits the switch control signal to the fourth switch 4026, and the switch control signal is received by the gate electrode of the fourth switch 4026, and the fourth current channel is closed by the fourth switch 4026 according to the switch control signal. The sharing control line 406 transmits the sharing control signal to the third switch 4024, and the sharing control signal is received by the gate electrode of the third switch 4024, and the third current channel is closed by the third switch 4024 according to the sharing control signal. For example, as shown in FIG. 5, the polarities of the left-eye image signals L are opposite the polarities of the former frames. When displaying the left-eye image in the display panel, the switch control signal of the switch control line 407 is a low-level signal, and at this time, the fourth switch 4026 is turned off.

In a step 704, the electric charges of the second LC capacitor 4022 are received only by the first sharing capacitor 4025. The value of the voltage/electric charge of the second LC capacitor 4022 is reduced down to a predetermined value.

In the step 705, the sharing control line 406 is used to turn on the third switch 4024 with the use of the sharing control signal, and the switch control line 407 is used to turn on the fourth switch 4026 with the use of the switch control signal. Specifically, the switch control line 407 transmits the switch control signal to the fourth switch 4026, and the switch control signal is received by the gate electrode of the fourth switch 4026, and the fourth current channel is opened by the fourth switch 4026 according to the switch control signal. The sharing control line 406 transmits the sharing control signal to the third switch 4024, and the sharing control signal is received by the gate electrode of the third switch 4024, and the third current channel is opened by the third switch 4024 according to the sharing control signal. For example, as shown in FIG. 5, the polarities of the right-eye image signals R are identical to the polarities of the former frames. When displaying the right-eye image in the display panel, the switch control signal of the switch control line 407 is a high-level signal, and at this time, the fourth switch 4026 is turned on.

In a step 706, the second sharing capacitor 4027 and the first sharing capacitor 4025 are connected together for receiving the electric charges of the second LC capacitor 4022.

With the use of this invention, when using the 2-frame-inversion driving for the display panel in the present embodiment, the brightness between the right and left eye images of the displayed 3D images can be identical. Therefore, the 3D cross-talk and the image sticking phenomenon can be reduced, and the display panel can have a great display effect at a broad viewing angle.

Figure 8:
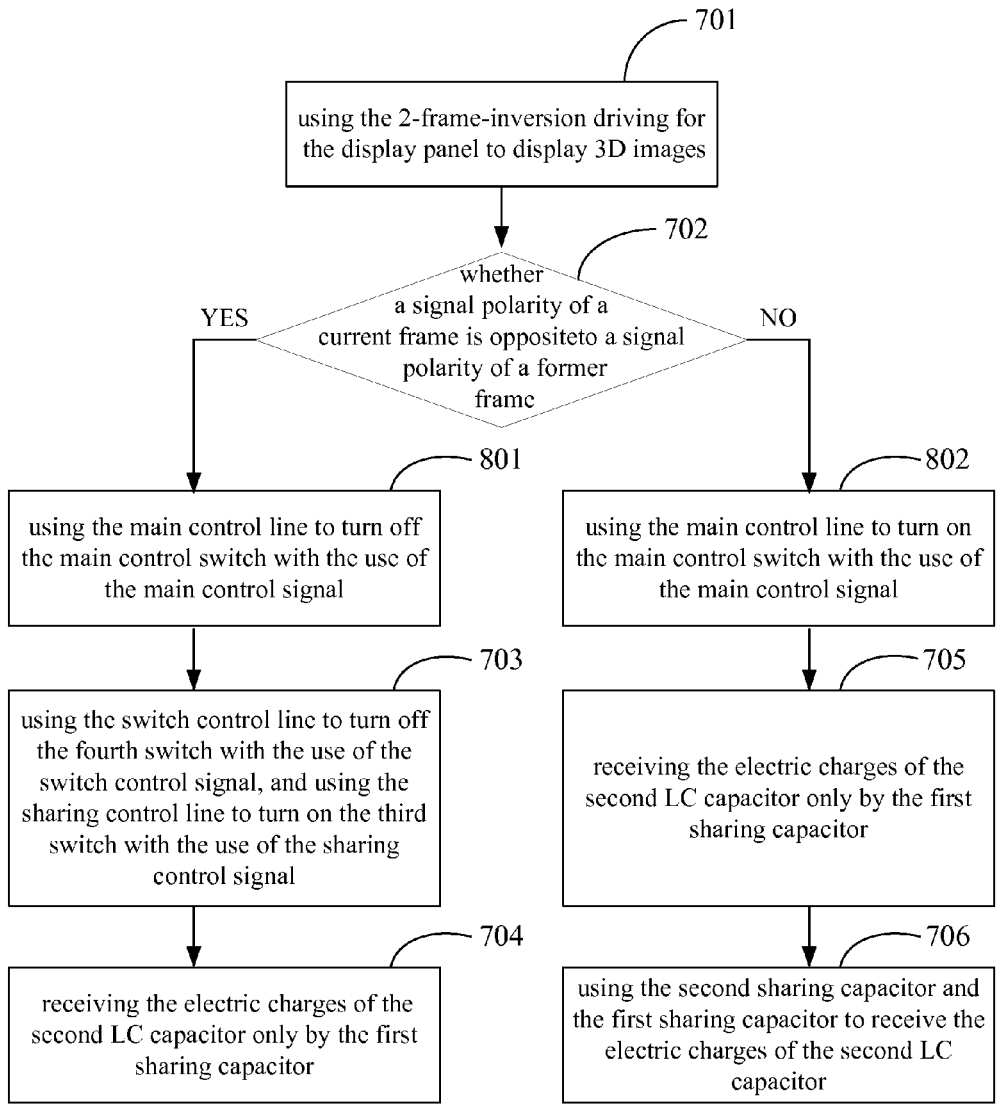
FIG. 8 is a flow diagram showing a driving method for the display panel according to a second embodiment of the present invention.

FIG. 8 is a flow diagram showing a driving method for the display panel according to a second embodiment of the present invention. This embodiment is similar to the first embodiment, and the differences there-between are described below.

The display panel can further comprise the main control line 409, and the pixel row unit 400 further comprises the main control switch 408.

After the step 702 and before the step 703, the method further comprises the step described as follow.

In a step 801, the main control line 409 is used to turn off the main control switch 408 with the use of the main control signal. Specifically, the main control line 409 transmits the main control signal to the main control switch 408, and the main control signal is received by the gate electrode of the main control switch 408, so as to turn off the main control switch 408. At this time, the main control signal 503 is a low-level signal, and the sharing control line 406 and the switch control line 407 are disconnected.

After the step 702 and before the step 705, the method further comprises the step described as follows.

In a step 801, the main control line 409 is used to turn on the main control switch 408 with the use of the main control signal. Specifically, the main control line 409 transmits the main control signal to the main control switch 408, and the main control signal is received by the gate electrode of the main control switch 408, so as to turn on the main control switch 408. At this time, the main control signal 503 is a high-level signal, and the sharing control line 406 and the switch control line 407 are connected to each other.

FIG. 8 is a flow diagram showing a driving method for the display panel according to a second embodiment of the present invention. This embodiment is similar to the first embodiment, and the differences there-between are described below.

A driving method for the display panel according to a third embodiment is similar to the first or second embodiment, and the differences there-between are described below.

This method further comprises the step described as follows.

When the display panel is in the 2D display mode, the main control signal is configured to turn off the main control switch 408. Specifically, the main control line 409 transmits the main control signal to the main control switch 408, and the main control signal is received by the gate electrode of the main control switch 408, so as to turn off the main control switch 408. At this time, the main control signal is a low-level signal, and the sharing control line 406 and the switch control line 407 are disconnected.

A driving method for the display panel according to a fourth embodiment is similar to the first or second embodiment, and the differences there-between are described below.

In the display panel of this embodiment, the sharing control line 406 is connected to the charge control line of another adjacent pixel row unit. That is, the sharing control line in the m-th row is connected to the charge control line in the (m+1)-th row. At this time, the sharing control signal of the sharing control line in the m-th row and the charge control signal of the charge control line in the (m+1)-th row are the same signals.

This method further comprises the step described as follows.

When the main control switch of the pixel row unit in the m-th row is turned on, the charge control signal of the charge control line of the pixel row unit in the (m+1)-th row (the another adjacent pixel row) is received by the sharing control line and the switch control line in the m-th row. Herein, m is a positive integer.

The present invention has been described with preferred embodiments thereof and it is understood that many changes and modifications to the described embodiment can be carried out without departing from the scope and the spirit of the invention that is intended to be limited only by the appended claims.

The invention claimed is:
1. A display panel, wherein the display panel comprises:
at least one data line; and
at least two pixel row units, wherein each of the pixel row units comprises:
a common line;
at least two pixel units, wherein each of the pixel units comprises:
a first pixel including a first switch and a first liquid crystal (LC) capacitor; and
a second pixel including a second switch, a second LC capacitor, a third switch and a first sharing capacitor, wherein the third switch is connected to the second LC capacitor and the first sharing capacitor, and the first pixel and the second pixel are connected to the data line and the common line;
a charge control line configured to control the turning on/off of the first switch and the second switch with the use of a charge control signal; and
a sharing control line configured to control the turning on/off of the third switch with the use of a sharing control signal;
wherein each of the pixel units further comprises:
a fourth switch;
a second sharing capacitor, wherein the fourth switch is connected to the first sharing capacitor and the second sharing capacitor; and
a switch control line configured to control the turning on/off of the fourth switch with the use of a switch control signal;
wherein the charge control line is connected to a first gate electrode of the first switch and a second gate electrode of the second switch, and the data line is connected to a first source electrode of the first switch and a second source electrode of the second switch, and the first LC capacitor is connected to a first drain electrode of the first switch, and the second LC capacitor is connected to a second drain electrode of the second switch, and a third gate electrode of the third switch is connected to the sharing control line, and a fourth gate electrode of the fourth switch is connected to the switch control line, and a third source electrode and a third drain electrode of the third switch are connected to the second drain electrode and the fourth switch, respectively;

wherein, in a 3D display mode of the display panel and using a 2-frame-inversion driving, when a signal polarity of a current frame is opposite to a signal polarity of a former frame, the switch control line transmits the switch control signal to turn off the fourth switch, and the sharing control line transmits the sharing control signal to turn on the third switch, such that electric charges from the second LC capacitor is received by the first sharing capacitor;

wherein, in the 3D display mode of the display panel and using the 2-frame-inversion driving, when the signal polarity of the current frame is identical to the signal polarity of the former frame, the switch control line transmits the switch control signal to turn on the fourth switch, and the sharing control line transmits the sharing control signal to turn on the third switch, such that electric charges from the second LC capacitor is received by the first sharing capacitor and the second sharing capacitor.

2. The display panel according to claim 1, wherein, when the display panel is in a 2D display mode, the fourth switch is configured to close a fourth current channel between the second sharing capacitor and the first sharing capacitor/ the third switch.

3. The display panel according to claim 1, wherein the display panel further comprises a main control line, and the pixel row unit further comprises a main control switch, and a first terminal of the main control switch is connected to the sharing control line, and a second terminal of the main control switch is connected to the switch control line, and a third terminal of the main control switch is connected to the main control line, and the main control line is configured to control the turning on/off of the main control switch by using a main control signal.

4. The display panel according to claim 3, wherein, in the 3D display mode of the display panel and using the 2-frame-inversion driving, when the signal polarity of the current frame is opposite to the signal polarity of the former frame, the main control signal is used to turn off the main control switch.

5. The display panel according to claim 3, wherein, in the 3D display mode of the display panel and using the 2-frame-inversion driving, when the signal polarity of the current frame is identical to the signal polarity of the former frame, the main control signal is used to turn on the main control switch, and the first sharing control signal and the second sharing control signal are the same signals.

6. The display panel according to claim 3, wherein, when the display panel is in a 2D display mode, the main control signal is used to turn off the main control switch.

7. The display panel according to claim 3, wherein the sharing control line is connected to the charge control line of another adjacent pixel row unit.

8. A display panel, wherein the display panel comprises:
at least one data line; and
at least two pixel row units, wherein each of the pixel row units comprises:
a common line;
at least two pixel units, wherein each of the pixel units comprises:
a first pixel including a first switch and a first liquid crystal (LC) capacitor; and
a second pixel including a second switch, a second LC capacitor, a third switch and a first sharing capacitor, wherein the third switch is connected to the second LC capacitor and the first sharing capacitor, and the first pixel and the second pixel are connected to the data line and the common line;
a charge control line configured to control the turning on/off of the first switch and the second switch with the use of a charge control signal; and
a sharing control line configured to control the turning on/off of the third switch with the use of a sharing control signal;
wherein each of the pixel units further comprises:
a fourth switch;
a second sharing capacitor, wherein the fourth switch is connected to the first sharing capacitor and the second sharing capacitor; and
a switch control line configured to control the turning on/off of the fourth switch with the use of a switch control signal;
wherein the charge control line is connected to a first gate electrode of the first switch and a second gate electrode of the second switch, and the data line is connected to a first source electrode of the first switch and a second source electrode of the second switch, and the first LC capacitor is connected to a first drain electrode of the first switch, and the second LC capacitor is connected to a second drain electrode of the second switch, and a third gate electrode of the third switch is connected to the sharing control line, and a fourth gate electrode of the fourth switch is connected to the switch control line, and a third source electrode and a third drain electrode of the third switch are connected to the second drain electrode and the fourth switch, respectively.

9. The display panel according to claim 8, wherein, in a 3D display mode of the display panel and using a 2-frame-inversion driving, when a signal polarity of a current frame is opposite to a signal polarity of a former frame, the switch control line transmits the switch control signal to turn off the fourth switch, and the sharing control line transmits the sharing control signal to turn on the third switch, such that electric charges from the second LC capacitor is received by the first sharing capacitor.

10. The display panel according to claim 8, wherein, in a 3D display mode of the display panel and using a 2-frame-inversion driving, when a signal polarity of a current frame is identical to a signal polarity of a former frame, the switch control line transmits the switch control signal to turn on the fourth switch, and the sharing control line transmits the sharing control signal to turn on the third switch, such that electric charges from the second LC capacitor is received by the first sharing capacitor and the second sharing capacitor.

11. The display panel according to claim 8, wherein, when the display panel is in a 2D display mode, the fourth switch is configured to close a fourth current channel between the second sharing capacitor and the first sharing capacitor/ the third switch.

12. The display panel according to claim 8, wherein the display panel further comprises a main control line, and the pixel row unit further comprises a main control switch, and a first terminal of the main control switch is connected to the sharing control line, and a second terminal of the main control switch is connected to the switch control line, and a third terminal of the main control switch is connected to the main control line, and the main control line is configured to control the turning on/off of the main control switch by using a main control signal.

13. The display panel according to claim 12, wherein, in the 3D display mode of the display panel and using the 2-frame-inversion driving, when the signal polarity of the current frame is opposite to the signal polarity of the former frame, the main control signal is used to turn off the main control switch.

14. The display panel according to claim 12, wherein, in the 3D display mode of the display panel and using the 2-frame-inversion driving, when the signal polarity of the current frame is identical to the signal polarity of the former frame, the main control signal is used to turn on the main control switch, and the first sharing control signal and the second sharing control signal are the same signals.

15. The display panel according to claim 12, wherein, when the display panel is in a 2D display mode, the main control signal is used to turn off the main control switch.

16. The display panel according to claim 12, wherein the sharing control line is connected to the charge control line of another adjacent pixel row unit.

17. A driving method for the display panel according to claim 8, wherein the driving method comprises:
   in a 3D display mode of the display panel and using a 2-frame-inversion driving, when a signal polarity of a current frame is opposite to a signal polarity of a former frame, using the switch control line to transmit the switch control signal for turning off the fourth switch, and using the sharing control line to transmit the sharing control signal for turning on the third switch, such that electric charges from the second LC capacitor is received by the first sharing capacitor; and
   in the 3D display mode of the display panel and using the 2-frame-inversion driving, when the signal polarity of the current frame is identical to the signal polarity of the former frame, using the switch control line to transmit the switch control signal for turning on the fourth switch, and using the sharing control line to transmit the sharing control signal for turning on the third switch, such that electric charges from the second LC capacitor is received by the first sharing capacitor and the second sharing capacitor.

18. The driving method according to claim 17, wherein the display panel further comprises a main control line, and the pixel row unit further comprises a main control switch, and the driving method further comprises:
   in the 3D display mode of the display panel and using the 2-frame-inversion driving, when the signal polarity of the current frame is opposite to the signal polarity of the former frame, using the main control signal to turn off the main control switch; and
   when the signal polarity of the current frame is identical to the signal polarity of the former frame, using a main control signal from the main control line to turn on the main control switch.

19. The driving method according to claim 17, wherein the driving method further comprises:
   when the display panel is in a 2D display mode, using a main control signal from the main control line to turn off the main control switch.

\* \* \* \* \*